(12) United States Patent
Kondapalli et al.

(10) Patent No.: US 11,617,227 B2
(45) Date of Patent: *Mar. 28, 2023

(54) TECHNOLOGIES FOR PROVIDING HARDWARE RESOURCES AS A SERVICE WITH DIRECT RESOURCE ADDRESSABILITY

(71) Applicant: Intel Corporation, Santa Clara, CA (US)

(72) Inventors: Raghu Kondapalli, San Jose, CA (US); Alexander Bachmutsky, Sunnyvale, CA (US); Francesc Guim Bernat, Barcelona (ES); Ned M. Smith, Beaverton, OR (US); Kshitij A. Doshi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/193,537

(22) Filed: Mar. 5, 2021

(65) Prior Publication Data
US 2021/0400769 A1 Dec. 23, 2021

Related U.S. Application Data

(63) Continuation of application No. 16/705,391, filed on Dec. 6, 2019, now Pat. No. 10,945,309, which is a
(Continued)

(51) Int. Cl.
*H04W 88/18* (2009.01)
*H04W 48/18* (2009.01)
(Continued)

(52) U.S. Cl.
CPC .......... *H04W 88/18* (2013.01); *G06F 9/5027* (2013.01); *H04L 47/74* (2013.01); *H04L 67/60* (2022.05);
(Continued)

(58) Field of Classification Search
CPC ... H04W 88/18; H04W 40/246; H04W 48/18; G06F 9/5027; G06F 2209/463;
(Continued)

(56) References Cited

U.S. PATENT DOCUMENTS 7,599,290 B2 * 10/2009 Dos Remedios ....... H04L 47/20
370/230.1
7,634,650 B1 * 12/2009 Shah ..................... G06F 3/0662
713/168
(Continued)

FOREIGN PATENT DOCUMENTS

CN 108985441 12/2018
EP 3293935 A1 * 3/2018 ........... H04L 63/101
(Continued)

OTHER PUBLICATIONS

United States Patent and Trademark Office, "Notice of Allowance," dated Sep. 18, 2019 in connection with U.S. Appl. No. 16/369,420, 17 pages.
(Continued)

*Primary Examiner* — Mahendra R Patel
(74) *Attorney, Agent, or Firm* — Hanley, Flight and Zimmerman, LLC

(57) ABSTRACT

Technologies for providing hardware resources as a service with direct resource addressability are disclosed. According to one embodiment of the present disclosure, a device receives a request to access a destination accelerator device in an edge network, the request specifying a destination address assigned to the destination accelerator device. The device determines, as a function of the destination address, a location of the destination accelerator device and sends the request to the destination accelerator device.

24 Claims, 6 Drawing Sheets

Related U.S. Application Data continuation of application No. 16/369,420, filed on Mar. 29, 2019, now Pat. No. 10,542,586.

(51) Int. Cl.

| | | |
|---|---|---|
| *H04L 47/74* | (2022.01) | |
| *G06F 9/50* | (2006.01) | |
| *H04W 40/24* | (2009.01) | |
| *H04L 67/60* | (2022.01) | |

(52) U.S. Cl.
CPC ......... *H04W 40/246* (2013.01); *H04W 48/18* (2013.01)

(58) Field of Classification Search
CPC . G06F 2209/509; G06F 9/5044; H04L 47/74; H04L 67/60; H04L 67/10; H04L 67/12; H04L 67/52; H04L 67/63
USPC ...................................................... 455/414.1
See application file for complete search history.

(56) References Cited

U.S. PATENT DOCUMENTS

| | | | |
|---|---|---|---|
| 8,560,646 B1 | 10/2013 | Sivasubramanian et al. | |
| 9,251,114 B1* | 2/2016 | Ancin | ...................... G06F 21/62 |
| 10,542,586 B2 | 1/2020 | Kondapalli et al. | |
| 10,945,309 B2 | 3/2021 | Kondapalli et al. | |
| 2002/0152305 A1* | 10/2002 | Jackson | ................. H04L 43/00 |
| | | | 709/224 |
| 2009/0092137 A1* | 4/2009 | Haigh | ..................... H04L 49/20 |
| | | | 370/392 |
| 2009/0180377 A1 | 7/2009 | Sullivan et al. | |
| 2010/0054123 A1 | 3/2010 | Yong | |
| 2013/0346483 A1 | 12/2013 | Alstad et al. | |
| 2014/0044018 A1 | 2/2014 | Billau et al. | |
| 2014/0173076 A1 | 6/2014 | Ravindran et al. | |
| 2014/0289791 A1* | 9/2014 | Acharya | ............. H04L 63/0236 |
| | | | 726/1 |
| 2014/0355436 A1* | 12/2014 | Zhang | .................... H04L 47/10 |
| | | | 370/232 |
| 2016/0006696 A1 | 1/2016 | Donley et al. | |
| 2016/0191664 A1* | 6/2016 | Balakrishnan | ...... H04L 41/5096 |
| | | | 709/203 |
| 2016/0315973 A1* | 10/2016 | Harp | ....................... H04L 63/08 |
| 2016/0337175 A1* | 11/2016 | Rao | ........................ H04L 49/25 |
| 2016/0337180 A1 | 11/2016 | Rao | |
| 2018/0007580 A1 | 1/2018 | Kang et al. | |
| 2018/0139274 A1 | 5/2018 | Gandhi et al. | |
| 2018/0198842 A1* | 7/2018 | Chandran | ............. H04L 45/66 |
| 2018/0331953 A1 | 11/2018 | Hoang et al. | |
| 2018/0332524 A1* | 11/2018 | Rasanen | ................. H04L 63/08 |
| 2019/0036808 A1 | 1/2019 | Shenoy et al. | |
| 2019/0044886 A1 | 2/2019 | Bernat et al. | |
| 2019/0297050 A1* | 9/2019 | Chu | ........................ H04L 45/66 |

FOREIGN PATENT DOCUMENTS

| | | | | |
|---|---|---|---|---|
| JP | 2003152778 | | 5/2003 | |
| JP | 2008288764 | | 11/2008 | |
| WO | WO-2008138008 A1 * | | 11/2008 | ....... G06F 17/30132 |
| WO | WO-2012102827 A2 * | | 8/2012 | ............ H04L 47/20 |
| WO | 2017066936 | | 4/2017 | |
| WO | 2018206844 | | 11/2018 | |
| WO | 2018215816 | | 11/2018 | |

OTHER PUBLICATIONS

United States Patent and Trademark Office, "Notice of Allowance," dated Nov. 6, 2020 in connection with U.S. Appl. No. 16/705,391, 14 pages.

United States Patent and Trademark Office, "Corrected Notice of Allowability," dated Dec. 11, 2020 in connection with U.S. Appl. No. 16/705,391, 2 pages.

* cited by examiner

TECHNOLOGIES FOR PROVIDING HARDWARE RESOURCES AS A SERVICE WITH DIRECT RESOURCE ADDRESSABILITY

RELATED APPLICATIONS

This patent arises from a continuation of U.S. patent application Ser. No. 16/705,391, entitled "TECHNOLOGIES FOR PROVIDING HARDWARE RESOURCES AS A SERVICE WITH DIRECT RESOURCE ADDRESSABILITY," which was filed on Dec. 6, 2019, which is a continuation application of U.S. patent application Ser. No. 16/369,420, entitled "TECHNOLOGIES FOR PROVIDING HARDWARE RESOURCES AS A SERVICE WITH DIRECT RESOURCE ADDRESSABILITY," which was filed on Mar. 29, 2019. U.S. patent application Ser. No. 16/705,391 and U.S. patent application Ser. No. 16/369,420 are hereby incorporated herein by reference in their entireties. Priority to U.S. patent application Ser. No. 16/705,391 and U.S. patent application Ser. No. 16/369,420 is claimed.

BACKGROUND

Edge computing provides techniques for processing resources at a location in closer network proximity to a requesting device, as opposed to a centralized location in a cloud network. Doing so ensures that devices receive critical data relatively quickly. Further, service providers within an edge network may provide services accessible by edge devices for various applications. For example, a service provider may implement Function-as-a-Service (FaaS) services that an edge device may request. In particular, an edge device may send a request, to a FaaS service, to execute an accelerated function on accelerator devices hosted by the service provider. Doing so allows the edge device to carry out workload operations relatively faster than if the operations were performed on a traditional processor. Further, because the accelerated functions are carried out over the edge network, the edge device can receive the result of the accelerated function at a relatively low latency.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
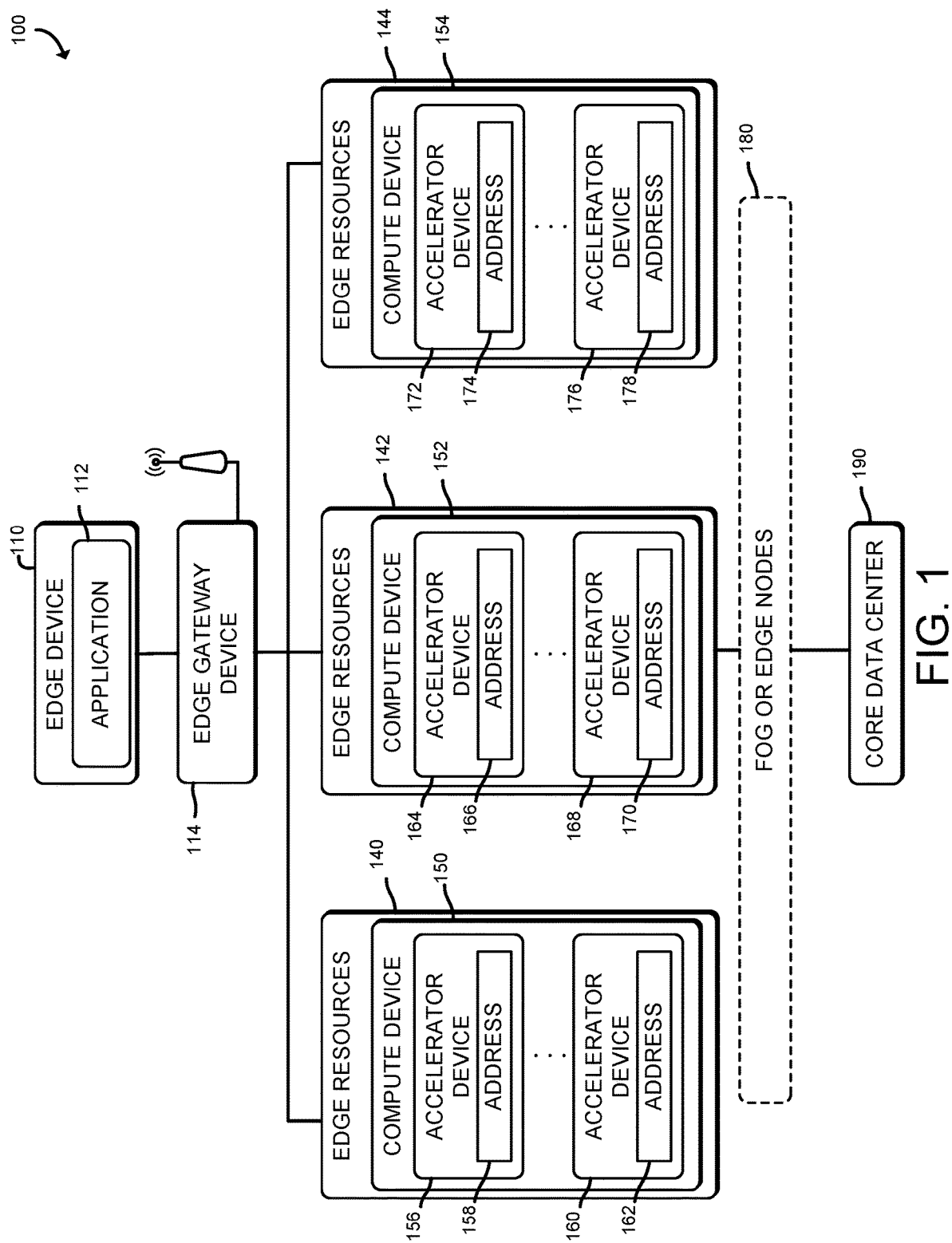
FIG. 1 is a simplified diagram of at least one embodiment of a system hosting directly addressable hardware resources (e.g., accelerator devices)

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 hosting directly addressable hardware resources (e.g., accelerator devices) is shown. The illustrative system 100 includes an edge device 110 in communication with an edge gateway device 114. The edge gateway device 114 may be embodied as any device capable of communicating data between the edge device 110 and one or more edge resources 140, 142, 144 (e.g., resources, such as compute devices and the components thereof, owned and/or operated by one or more service providers, such as cellular network operators) or other compute devices located in a cloud. Further, the edge gateway device 114, in the illustrative embodiment, is configured to receive and respond to requests from the edge device 110 regarding characteristics of the edge resources 140, 142, 144, such as architectures of processors, accelerator devices, and/or other components in the edge resources 140, 142, 144 (e.g., in compute devices 150, 152, 154 forming the edge resources 140, 142, 144, respectively), latencies, power usage, and costs (e.g., monetary costs) associated with utilizing those edge resources 140, 142, 144. The edge gateway device 114 and the edge resources 140, 142, 144, in the illustrative embodiment, are positioned at one or more locations (e.g., in small cell(s), base station(s), etc.) along the edge (e.g., in an edge network) of a cloud.

An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. Further, the system 100 may be organized in a hierarchical structure having multiple tiers. For example, a given tier may include the aforementioned edge computing devices, e.g., edge computing devices in locations that are of a relative network proximity to the edge device 110. A next tier may include cell towers and base stations providing edge resources. The following tier may include a central office station in a core data center 190.

It should be appreciated that, in some embodiments, the edge network may form a portion of or otherwise provide an ingress point into a fog network (e.g., fog or edge nodes 180), which may be embodied as a system-level horizontal architecture that distributes resources and services of computing, storage, control and networking anywhere between a core data center 190 (e.g., a data center that is farther away from and in a higher level of the hierarchy of the system 100 than the edge resources 140, 142, 144, and that includes multiple compute devices capable of executing one or more services (e.g., processes on behalf of one or more clients)) and an endpoint device (e.g., the edge device 110).

In an embodiment, the edge device 110 executes an application 112 (e.g., using a processor and/or accelerator device(s)) included therein. The application 112 may include one or more services or workloads for processing. For example, assume that the edge device 110 is representative of an autonomous vehicle connected to the edge network forming the system 100. The application 112 may include various functions for ensuring normal operation of the autonomous vehicle, such as location, navigation, and other functions used to operate the vehicle. Further, the application 112 may request data from services provided by edge resources 140, 142, 144. Generally, the edge gateway device 114 may receive such requests. The edge gateway device 114 may thereafter evaluate the request and forward the request to an appropriate service operated by one of the service providers (or to the fog or edge nodes 180 or core data center 190). Other edge device 110 and application 112 use cases may include IoT devices in smart cities, augmented reality (AR)/virtual reality (VR), assisted driving vehicles, factory automation, proximity triggered services, and so on.

Further, an edge device 110 may send requests to Function-as-a-Service (FaaS) services included as part of the edge resources 140, 142, 144. A FaaS service allows the application 112 to access accelerated functions hosted by the service providers on an accelerated device. For example, each of the compute devices 140, 142, 144 host accelerator resources, e.g., accelerator devices 156, 160, 164, 168, 172, 174, each being programmable for one or more accelerated functions. An accelerated function may be embodied as predefined bit stream data to be executed on an accelerator device provided by the edge resources 140, 142, 144, such as a field programmable gate array (FPGA), application specific integrated circuit (ASIC), graphics processing unit (GPU) etc.). Advantageously, an application 112 may request accelerated functions to accelerate execution of workload operations (e.g., AR/VR functions, machine learning functions, matrix operations, and so on).

A given workload may involve a number of accelerated functions executed one after another. For example, assume that the application 112 requests access to a service provided by the edge network for facial recognition. In some cases, a facial recognition technique can include multiple accelerated functions, such as for data decryption, foreground extraction, object classification, and bounding box creation. In this example, each of these multiple accelerated functions may be hosted on different accelerator devices. When an accelerated function is complete, the accelerator device may need to forward the result to another accelerator device, which might be managed by different software and hardware stacks. Doing so might involve the accelerator device sending a request to the compute device. The request might be processed by a central processing unit (CPU) worker core to determine the appropriate accelerator device, adding to latency and overhead in fulfilling a given service.

To address such latency and overhead issues, embodiments disclose techniques for addressing resources in the system 100. For instance, each of the illustrative accelerator devices 156, 160, 164, 168, 172, 176 is assigned an address 158, 162, 166, 170, 174, 178, respectively. More particularly, each address is mapped to a particular accelerator device in the edge network. As a result, a given device requiring resources from one of the accelerator devices 156, 160, 164, 168, 172, 174 may send a request specifying the address associated with that accelerator device. As further described herein, various addressing schemes may be used to assign an address to an accelerator device, such as by providing a global memory address space, a virtual memory address space, a network address space, and the like.

Advantageously, by configuring hardware resources in the system 100 to be independently addressable, requests to such resources may be served with a relatively lower latency. For instance, rather than communicating with a CPU worker core to determine a particular accelerator device hosting an accelerated function, an entity (e.g., an accelerator device, service, other device, etc.) may provide, in a request, an address assigned to a particular accelerator device hosting a desired accelerated function. Doing so reduces CPU cost in servicing a given request.

Figure 2:
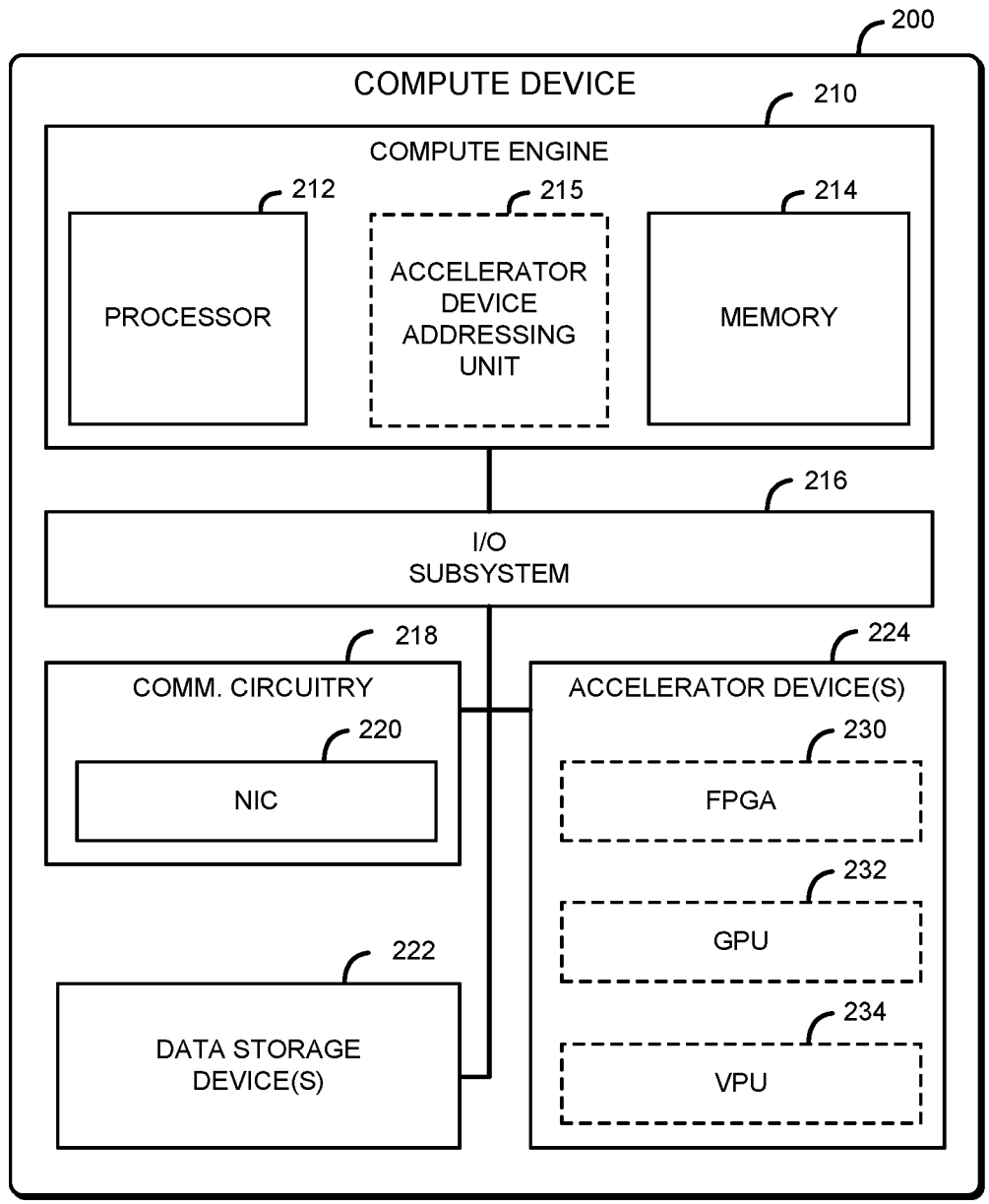
FIG. 2 is a simplified block diagram of at least one embodiment of a compute device of the system described relative to FIG. 1.

Referring now to FIG. 2, a simplified block diagram of a compute device 200 is shown. The compute device 200 may be embodied as one or more physical compute devices or a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer). Further, the compute device 200 may be embodied as any of the compute devices of the system 100 described relative to FIG. 1 (e.g., compute devices 140, 142, 144). The illustrative compute device 200 includes a compute engine (also referred to herein as "compute engine circuitry") 212, an input/output (I/O) subsystem 216, communication circuitry 218, and one or more data storage devices 222. As described herein, the compute device 200 also includes one or more accelerator devices 224. Of course, in other embodiments, the compute device 200 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214.

The processor 212 may be embodied as any type of processor capable of performing the functions described herein (e.g., processing service requests to edge resources of an edge device 110). For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, other specialized hardware, or virtualized version thereof, etc., to facilitate performance of the functions described herein.

The memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 214 may be integrated into the processor 212. In operation, the memory 214 may store various software and data used during operation such as one or more applications, data operated on by the application(s), libraries, and drivers.

Each accelerator device(s) 224 may be embodied as any device(s) or circuitries configured to execute a set of operations faster than the processor 212 is capable of executing the operations, such as machine learning or artificial intelligence operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include a graphics processing unit (GPU) 232, which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU) 234, which may be embodied as any device or circuitry (e.g., a programmable logic chip, a processor, etc.) configured to perform operations related to machine vision.

In addition, the illustrative compute engine 210 also includes an accelerator device addressing unit 215. The accelerator device addressing unit 215 may be embodied as any device or circuitry to assign an address for each of the accelerator devices 224. More particularly, the accelerator device addressing unit 215 may map a given accelerator device as a function of an addressing scheme for accelerator devices in the system 100. The system 100 may use various addressing schemes, including multiple simultaneously active addressing schemes for a single accelerator or differing accelerators. An example addressing scheme may include allocating an address space in the memory 214 dedicated to the accelerator devices 224. Another addressing scheme includes a network addressing scheme, in which the accelerator device addressing unit 215 is configured to assign a network address (e.g., an IP address, a media access control (MAC) address, etc.).

The compute engine 210 is communicatively coupled to other components of the compute device 200 via the I/O subsystem 216, which may be embodied as circuitry and/or components to facilitate input/output operations with the compute engine 210 (e.g., with the processor 212, the memory 214, and/or the accelerator device addressing unit 215) and other components of the compute device 200. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the memory 214, and other components of the compute device 200, into the compute engine 210.

The communication circuitry 218 may be embodied as any communication circuit, device, or collection thereof, capable of enabling communications over a network between the compute device 200 and another compute device (e.g., the edge device 110, edge gateway device 114, other compute devices in the system 100, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the compute device 200 to connect with another compute device (e.g., the edge device 110, edge gateway device 114, other compute devices in the system 100, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the compute device 200 at the board level, socket level, chip level, and/or other levels. In some embodiments, the NIC 220 may include one or more optionally addressable accelerators (not shown).

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems. Similarly to the NIC 220, the data storage devices 222 may include one or more optionally addressable accelerators (not shown).

The edge resources 140, 142, 144, the edge device 110, the edge gateway device 114, the fog nodes 180, and the core data center 190 may have components similar to those described in FIG. 2 with reference to the compute device 200. The description of those components of the compute device 200 is equally applicable to the description of components of the edge resources 140, 142, 144, the edge device 110, the fog nodes 180, and the core data center 190. Further, it should be appreciated that any of the edge resources 140, 142, 144, the edge device 110, the fog nodes 180, and the core data center 190 may include other components, sub-components, and devices commonly found in a computing device, which are not discussed above in reference to the compute device 200 and not discussed herein for clarity of the description. Further, it should be understood that one or more components of a compute device may be distributed across any distance, and are not necessarily housed in the same physical unit.

The edge gateway device 114, edge resources 140, 142, 144, the edge device 110, the fog nodes 180, and the core data center 190 are illustratively in communication via a network, which may be embodied as any type of wired or wireless communication network, or hybrids or combinations thereof, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
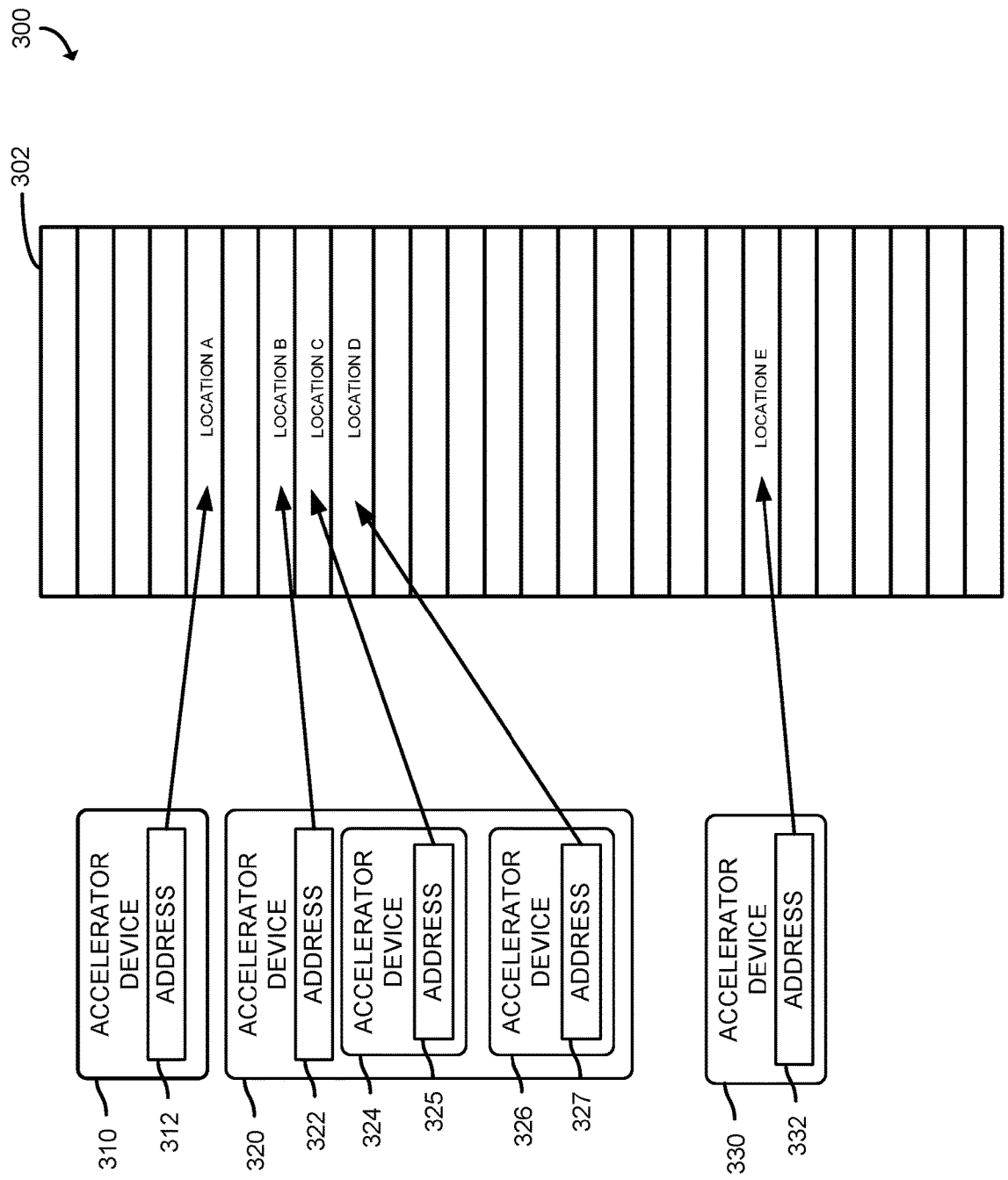
FIG. 3 is a simplified conceptual diagram of at least one embodiment of an address space in which an accelerator device may be addressed.

Referring now to FIG. 3, a simplified conceptual diagram depicting an example 300 of an address space 302 is shown. In an embodiment, the memory 214 may expose the address space 302 used to assign accelerator devices as an address directly accessible by an entity (e.g., another accelerator device). Illustratively, multiple accelerator devices are shown, such as accelerator devices 310, 320, and 330. Further illustratively, the accelerator device 320 includes multiple additional accelerator devices therein, particularly accelerator devices 324 and 326. As shown, each accelerator device is assigned an address: accelerator device 310 is associated with address 312, accelerator device 320 is associated with address 322, accelerator device 324 is associated with address 325, accelerator device 326 is associated with address 327, and accelerator device 330 is associated with address 332. Each of the addresses 312, 322, 325, 327, and 332 are mapped to a given location in the address space 302 (marked as locations A, B, C, D, and E, respectively). Each of the locations may correspond, for example, to a particular block of the memory 214. A compute device may publish addresses of each of the accelerator devices to an orchestrator in the edge network (e.g., a compute device within the core data center 190 or in one of the edge resources 140, 142, 144), and the orchestrator may in turn advertise the accelerator devices, accelerated functions provided by each accelerated devices, and addresses mapped to each accelerator device to requesting workloads.

Further, in some cases, the memory 214 may support multiple domains of address spaces 302, in which a user (e.g., a tenant of the system 100) has access to one or more of the domains. Doing so allows resources provided by a given domain to be restricted to a certain set of users. For example, a given domain 1 may be associated with a tenant A while a domain 2 may be associated with a tenant B. Tenant A may be able to access hardware resources provided by domain 1 but not those of domain 2. And tenant B may be able to access hardware resources provided by domain 2 but not those of domain 1.

Of course, various types of address spaces may be applied to hardware resources other than a memory address space. For example, accelerator devices may be assigned a network address (e.g., an IP address, MAC address, and the like). The compute device on which the accelerator device is hosted may send networking address information to the orchestrator and the edge gateway device 114. The edge gateway device 114 may route requests by a workload to an accelerator device based on the assigned network address provided in the request.

Figure 4:
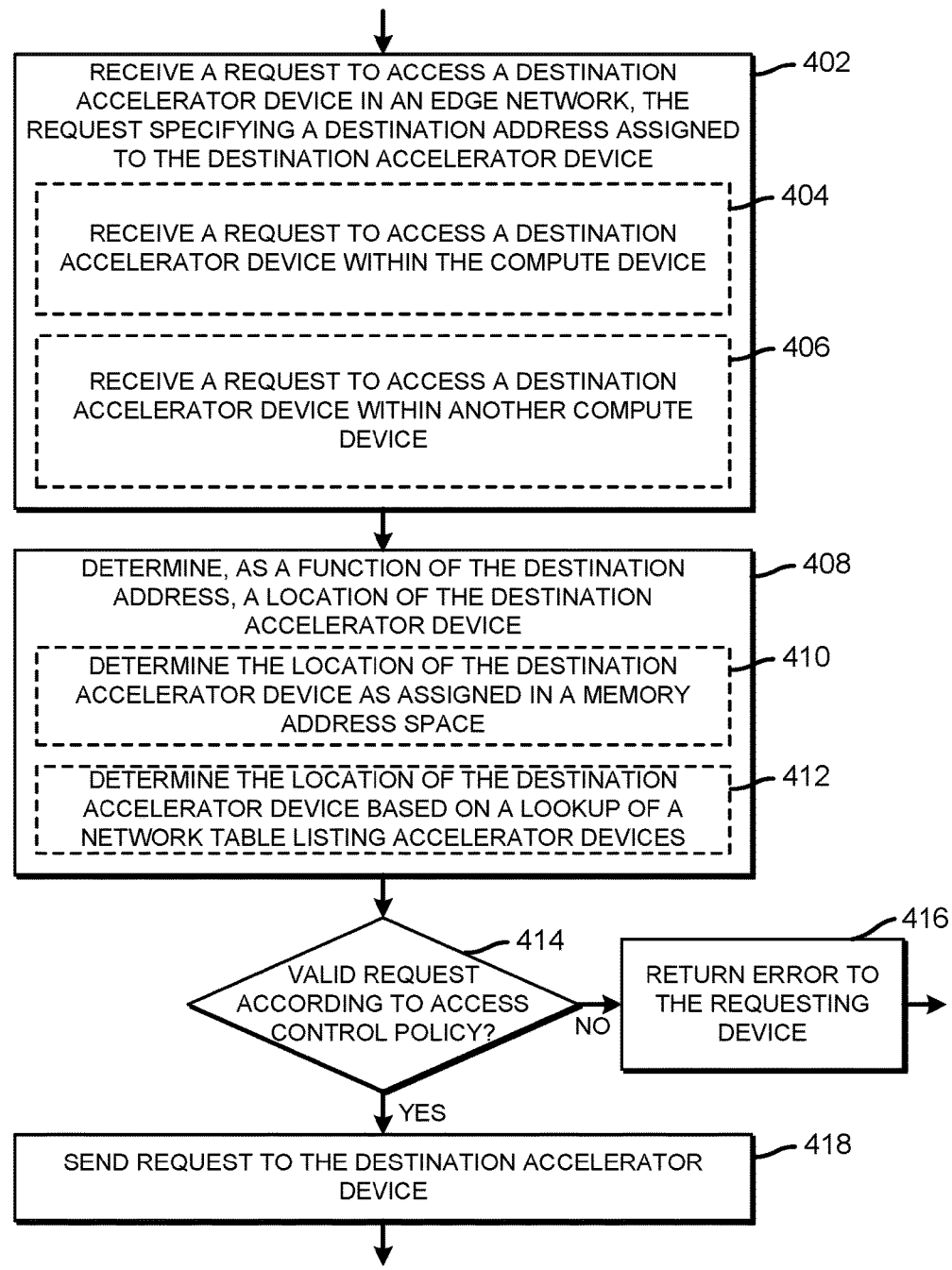
FIG. 4 is a simplified block diagram of at least one embodiment of a method for accessing an addressable hardware device (e.g., a directly addressable hardware device) within the system of FIG. 1.

Referring now to FIG. 4, a device in the system 100, in operation, may execute a method 400 for accessing resources in a directly addressable hardware resource, e.g., one of the accelerator devices of the system 100. For example, the device performing the method 400 may be a compute device in the system that has one or more accelerators hosted thereon. As shown, the method 400 begins in block 402, in which the compute device receives a request (e.g., from an accelerator device) to access a destination accelerator device in the edge network. The request specifies a destination address assigned to the destination accelerator device. The destination address may originally be obtained, e.g., by an orchestrator executing in the core data center 190, by the edge gateway device 114, etc. The destination accelerator device may be hosted in various locations. For example, in block 404, the compute device may receive the request to access the destination accelerator device, in which the destination accelerator device is hosted in the compute device performing the method 400. As another example, in block 406, the compute device may receive the request, in which the destination accelerator device is hosted in another compute device in the system 100.

In block 408, the compute device determines, as a function of the destination address, a location of the destination accelerator device. For example, to do so, in block 410, the compute device determines the location of the destination accelerator device by determining that the request specifies a memory location in a memory address space. The request may correspond to a function call to the accelerator device that, when invoked, specifies the assigned memory address of the accelerator device as input. As another example of doing so, in block 412, the compute device determines the location of the destination accelerator device by determining that the request specifies a network address assigned to the accelerator device. The compute device may query a network table to identify the corresponding device.

In an embodiment, access control policies may be applied to be determine whether the requesting entity has access to the destination accelerator device. For example, in the event that the request specifies an address belonging to a private domain in a memory address space, the compute device may determine whether the requestor has permissions to access devices within the private domain. An access control policy may include access initiator (e.g., a compute device or other device requesting accelerator resources), an access time, access frequency, and other parameters. In block 414, the compute device determines whether the request is valid according to an access control policy. If not, then in block 416, the compute device returns an error to the requesting device. Otherwise, in block 418, the compute device forwards the request to the destination accelerator device based on the specified address. While the reference above pertains to a situation in which a compute device requests access to accelerator resources, other service initiators may request the accelerator resources in a similar manner, including other accelerator devices.

Figure 5:
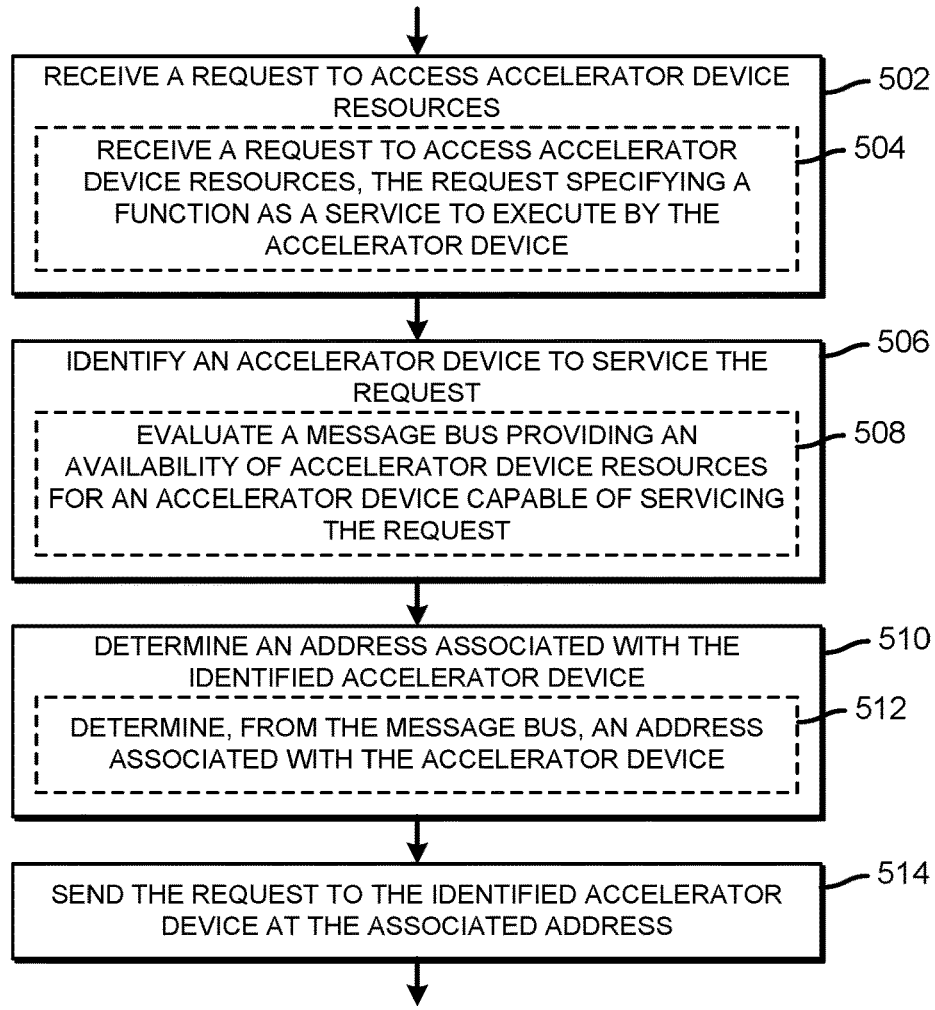
FIG. 5 is a simplified block diagram of at least one embodiment of a method for discovering accelerator resources in the system described relative to FIG. 1.

Referring now to FIG. 5, the compute device (or other service initiator such as an accelerator device), in operation, may perform a method 500 for discovering accelerator resources in the system 100. As shown, the method 500 begins in block 502, in which the compute device receives a request to access accelerator device resources. For example, in block 504, the compute device receives the request specifying an accelerated function-as-a-service to execute a processing task. In block 506, the compute device identifies an accelerator device to service the request. To do so, the compute device may evaluate a message bus thereon which provides an availability status of accelerator device resources for an accelerator device capable of servicing the request. The message bus may list the accelerator device resources, accelerated functions executing on each of the accelerator devices, and addresses at which the accelerator devices reside.

In block 510, the compute device determines an address associated with the identified accelerator device. More particularly, the compute device, in block 512, determines, from the evaluation of the message bus, an address associated with the accelerator device. In block 514, the compute device sends the request to the identified accelerator device at the associated address.

Figure 6:
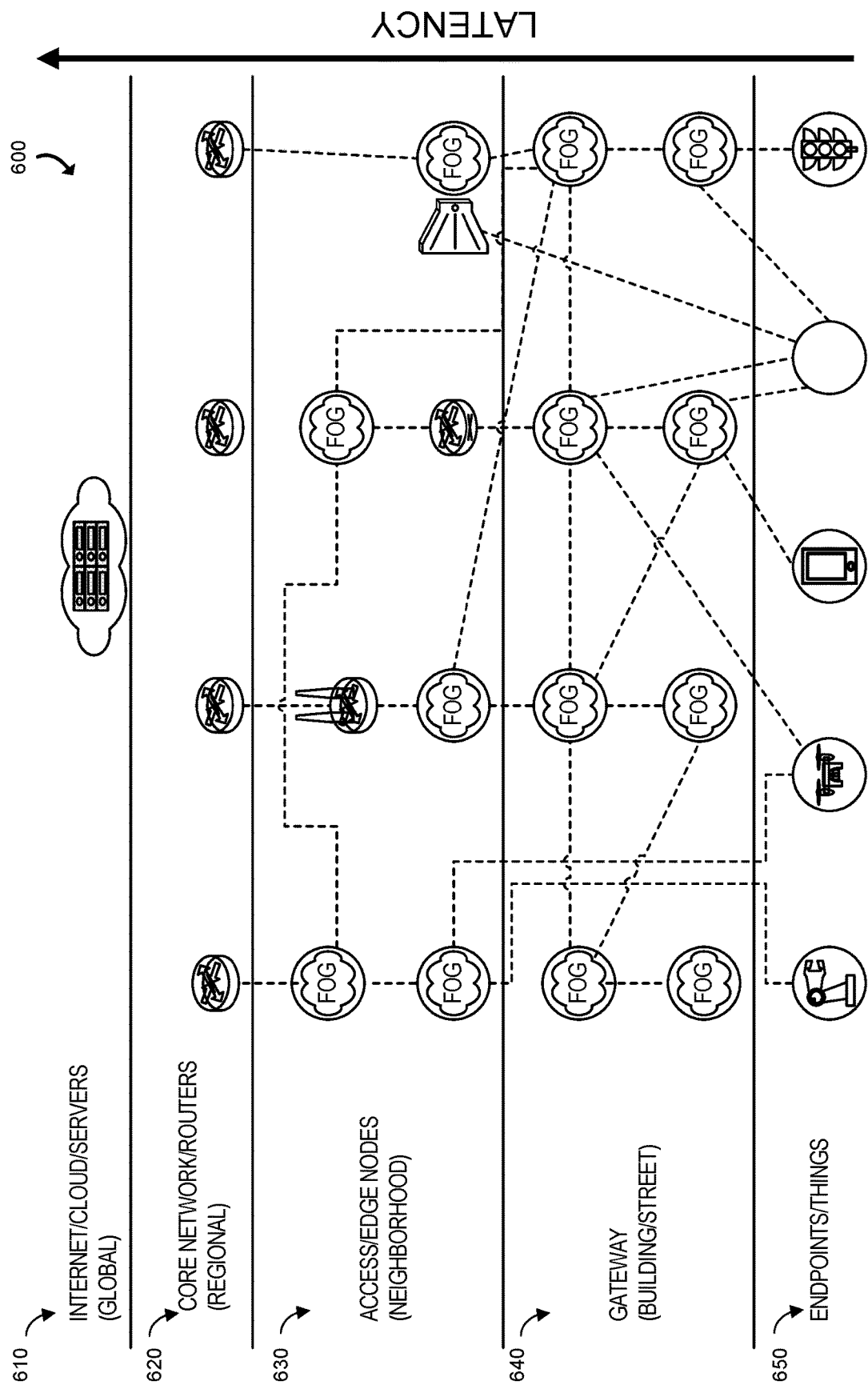
FIG. 6 is a simplified block diagram of a fog and mobile edge computing (MEC) network topology that may be utilized with the system of FIG. 1.

Referring briefly to FIG. 6, a MEC and fog network topology 600 is shown. The network topology 600 includes endpoints (at an endpoints/things network layer 650), gateways (at a gateway layer 640), access or edge computing nodes (e.g., at neighborhood nodes layer 630), core network or routers (e.g., at a regional or central office layer 620). A fog network (e.g., established at the gateway layer 640) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE of 5G core network), among others. In this context, FIG. 6 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a multi-access edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner, and, in some embodiments, may utilize features in existing MEC services that provide minimal overhead.

In addition to the MEC implementation described above, it should be appreciated that the foregoing systems and methods may implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may applied to improve the operations of any systems that rely on sensors to collect and act upon the collected information (e.g., threat detection and evacuation management systems, video monitoring systems, elevator control systems, etc.).

EXAMPLES

Illustrative examples of the technologies disclosed herein are provided below. An embodiment of the technologies may include any one or more, and any combination of, the examples described below.

Example 1 includes a compute device comprising circuitry to receive a request to access a destination accelerator device in an edge network, the request specifying a destination address assigned to the destination accelerator device; determine, as a function of the destination address, a location of the destination accelerator device; and send the request to the destination accelerator device.

Example 2 includes the subject matter of Example 1, and wherein to determine, as the function of the destination address, the location of the destination accelerator device comprises to determine the location of the destination accelerator device as a function of the destination address as assigned in a memory space.

Example 3 includes the subject matter of any of Examples 1 and 2, and wherein to determine the location of the destination accelerator device as a function of the destination address as assigned in the memory space comprises to determine the location as a function of the destination address as assigned in a private domain within the memory space.

Example 4 includes the subject matter of any of Examples 1-3, and wherein to determine, as the function of the destination address, the location of the destination accelerator device comprises to determine the location based on a lookup of a networking table listing a network address of the destination device.

Example 5 includes the subject matter of any of Examples 1-4, and wherein to receive the request to access the destination accelerator device in the edge network comprises to receive, by a source accelerator device of the device, a request to access the destination accelerator device of the compute device.

Example 6 includes the subject matter of any of Examples 1-5, and wherein to receive the request to access the destination accelerator device in the edge network comprises to receive, by a source accelerator device of the device, a request to access a destination accelerator device separate from the compute device.

Example 7 includes the subject matter of any of Examples 1-6, and wherein the circuitry is further to determine whether the request is valid according to an access control policy specifying at least one of an access initiator, destination address, access time, or access frequency.

Example 8 includes the subject matter of any of Examples 1-7, and wherein the circuitry is further to, upon a determination that the request is not valid, return an error in response to the request.

Example 9 includes the subject matter of any of Examples 1-8, and wherein the circuitry is further to receive a request to access accelerator resources.

Example 10 includes the subject matter of any of Examples 1-9, and wherein the circuitry is further to evaluate a message bus providing an availability status of accelerator device resources to identify an accelerator device to service the request to access the accelerator resources.

Example 11 includes a system comprising one or more processors; and a memory storing a plurality of instructions, which, when executed on the one or more processors, causes the system to receive a request to access a destination accelerator device in an edge network, the request specifying a destination address assigned to the destination accelerator device; determine, as a function of the destination address, a location of the destination accelerator device; and send the request to the destination accelerator device.

Example 12 includes the subject matter of Example 11, and wherein to determine, as the function of the destination address, the location of the destination accelerator device comprises to determine the location of the destination accelerator device as a function of the destination address as assigned in a memory space.

Example 13 includes the subject matter of any of Examples 11 and 12, and wherein to determine the location of the destination accelerator device as a function of the destination address as assigned in the memory space comprises to determine the location as a function of the destination address as assigned in a private domain within the memory space.

Example 14 includes the subject matter of any of Examples 11-13, and wherein to determine, as the function of the destination address, the location of the destination accelerator device comprises to determine the location based on a lookup of a networking table listing a network address of the destination device.

Example 15 includes the subject matter of any of Examples 11-14, and wherein to receive the request to access the destination accelerator device in the edge network comprises to receive, by a source accelerator device of the system, a request to access the destination accelerator device of the compute device.

Example 16 includes the subject matter of any of Examples 11-15, and wherein to receive the request to access the destination accelerator device in the edge network comprises to receive, by a source accelerator device of a compute device, a request to access a destination accelerator device separate from the compute device.

Example 17 includes the subject matter of any of Examples 11-16, and wherein the plurality of instructions further causes the system to determine whether the request is valid according to an access control policy specifying at least one of an access initiator, destination address, access time, or access frequency.

Example 18 includes the subject matter of any of Examples 11-17, and wherein the plurality of instructions further causes the system to, upon a determination that the request is not valid, return an error in response to the request.

Example 19 includes the subject matter of any of Examples 11-18, and wherein the plurality of instructions further causes the system to receive a request to access accelerator resources; and evaluate a message bus providing an availability status of accelerator device resources to identify an accelerator device to service the request to access the accelerator resources.

Example 20 includes a compute device comprising circuitry for receiving a request to access a destination accelerator device in an edge network, the request specifying a destination address assigned to the destination accelerator device; means for determining, as a function of the destination address, a location of the destination accelerator device; and circuitry for sending the request to the destination accelerator device.

What is claimed is:

1. An apparatus comprising:
   memory;
   instructions in the apparatus; and
   processor circuitry to execute the instructions to:
   determine a location of a destination accelerator device in an edge network in response to a request indicative of a destination address assigned to the destination accelerator device; and
   send the request to the destination accelerator device after: (1) a determination that the request is valid based on an access control policy, and (2) a determination of an availability of the destination accelerator device.

2. The apparatus of claim 1, wherein the processor circuitry is to execute the instructions to:
   determine that the location of the destination accelerator device is in a private domain; and
   determine that a requesting device has access to the destination accelerator device based on whether the requesting device has permission to access devices in the private domain.

3. The apparatus of claim 1, wherein the processor circuitry is to execute the instructions to determine the location of the destination accelerator device by querying a network table to identify the destination accelerator device.

4. The apparatus of claim 1, wherein the destination address is a memory address.

5. The apparatus of claim 1, wherein the destination address is a network address.

6. The apparatus of claim 1, wherein the processor circuitry is to execute the instructions to determine the location of the destination accelerator device by determining that the destination accelerator device is in the apparatus.

7. The apparatus of claim 1, wherein the processor circuitry is to execute the instructions to determine the location of the destination accelerator device by determining that the destination accelerator device is in a compute device separate from the apparatus.

8. The apparatus of claim 1, wherein the processor circuitry is to execute the instructions to determine the availability of the destination accelerator device by analyzing a message bus that includes a list of accelerator devices and addresses of the accelerator devices.

9. At least one machine-readable storage device or storage disc comprising instructions that, when executed by at least one processor, cause a compute device to at least:
   determine a location of a destination accelerator device in an edge network in response to a request indicative of a destination address assigned to the destination accelerator device; and
   send the request to the destination accelerator device after: (1) a determination that the request is valid based on an access control policy, and (2) a determination of an availability of the destination accelerator device.

10. The at least one machine-readable storage device or storage disc of claim 9, wherein the instructions are to cause the compute device to:
    determine that the location of the destination accelerator device is in a private domain; and
    determine that a requesting device has access to the destination accelerator device based on whether the requesting device has permission to access devices in the private domain.

11. The at least one machine-readable storage device or storage disc of claim 9, wherein the instructions are to cause the compute device to determine the location of the destination accelerator device by querying a network table to identify the destination accelerator device.

12. The at least one machine-readable storage device or storage disc of claim 9, wherein the destination address is a memory address.

13. The at least one machine-readable storage device or storage disc of claim 9, wherein the destination address is a network address.

14. The at least one machine-readable storage device or storage disc of claim 9, wherein the instructions are to cause the compute device to determine the location of the destination accelerator device by determining that the destination accelerator device is in the compute device.

15. The at least one machine-readable storage device or storage disc of claim 9, wherein the instructions are to cause the compute device to determine the location of the destination accelerator device by determining that the destination accelerator device is in a second compute device separate from the compute device.

16. The at least one machine-readable storage device or storage disc of claim 9, wherein the instructions are to cause the compute device to determine the availability of the destination accelerator device by analyzing a message bus that includes a list of accelerator devices and addresses of the accelerator devices.

17. An apparatus comprising:
at least one memory; and
processor circuitry including one or more of:
- at least one of a central processor unit, a graphic processor unit or a digital signal processor, the at least one of the central processor unit, the graphic processor unit or the digital signal processor having control circuitry to control data movement within the processor circuitry, arithmetic and logic circuitry to perform one or more first operations corresponding to instructions, and one or more registers to store a result of the one or more first operations, the instructions in the apparatus;
- a Field Programmable Gate Array (FPGA), the FPGA including first logic gate circuitry, a plurality of configurable interconnections, and storage circuitry, the first logic gate circuitry and interconnections to perform one or more second operations, the storage circuitry to store a result of the one or more second operations; or
- Application Specific Integrated Circuitry including second logic gate circuitry to perform one or more third operations;

the processor circuitry to perform at least one of the first operations, the second operations or the third operations to:
- determine a location of a destination accelerator device in an edge network in response to a request indicative of a destination address assigned to the destination accelerator device; and
- send the request to the destination accelerator device after: (1) a determination that the request is valid based on an access control policy, and (2) a determination of an availability of the destination accelerator device.

18. The apparatus of claim 17, wherein the processor circuitry to perform the at least one of the first operations, the second operations or the third operations to:

determine that the location of the destination accelerator device is in a private domain; and determine that a requesting device has access to the destination accelerator device based on whether the requesting device has permission to access devices in the private domain.

19. The apparatus of claim 17, wherein the processor circuitry to perform the at least one of the first operations, the second operations or the third operations to determine the location of the destination accelerator device by querying a network table to identify the destination accelerator device.

20. The apparatus of claim 17, wherein the destination address is a memory address.

21. The apparatus of claim 17, wherein the destination address is a network address.

22. The apparatus of claim 17, wherein the processor circuitry to perform the at least one of the first operations, the second operations or the third operations to determine the location of the destination accelerator device by determining that the destination accelerator device is in the apparatus.

23. The apparatus of claim 17, wherein the processor circuitry to perform the at least one of the first operations, the second operations or the third operations to determine the location of the destination accelerator device by determining that the destination accelerator device is in a compute device separate from the apparatus.

24. The apparatus of claim 17, wherein the processor circuitry to perform the at least one of the first operations, the second operations or the third operations to determine the availability of the destination accelerator device by analyzing a message bus that includes a list of accelerator devices and addresses of the accelerator devices.

* * * * *